(12) United States Patent
Bennett et al.

(10) Patent No.: US 6,868,469 B2
(45) Date of Patent: Mar. 15, 2005

(54) DATA BRIDGE AND BRIDGING

(75) Inventors: Joseph A. Bennett, Roseville, CA (US); Mikal C. Hunsaker, El Dorado Hills, CA (US); Anoop Mukker, Folsom, CA (US); Adit D. Tarmaster, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 09/870,808

(22) Filed: May 31, 2001

(65) Prior Publication Data

US 2002/0184428 A1 Dec. 5, 2002

(51) Int. Cl.[7] .............................................. G06F 13/36
(52) U.S. Cl. ..................... 710/306; 710/309; 710/310
(58) Field of Search ........................... 710/56, 57, 107, 710/112, 113, 114, 119, 121, 123, 306, 309, 310, 311, 314; 711/154

(56) References Cited

U.S. PATENT DOCUMENTS

| | | | | |
|---|---|---|---|---|
| 4,785,394 A | * | 11/1988 | Fischer | 710/114 |
| 5,826,045 A | * | 10/1998 | Reams | 710/107 |
| 6,425,024 B1 | * | 7/2002 | Kelley et al. | 710/56 |
| 6,457,077 B1 | * | 9/2002 | Kelley et al. | 710/56 |
| 6,581,141 B1 | * | 6/2003 | Kelley et al. | 711/154 |
| 6,647,454 B1 | * | 11/2003 | Solomon | 710/310 |
| 6,694,397 B2 | * | 2/2004 | Lackey et al. | 710/112 |
| 6,697,904 B1 | * | 2/2004 | Bennett | 710/309 |
| 2002/0120799 A1 | * | 8/2002 | Shah | |

OTHER PUBLICATIONS

INTEL, Intel® 440GX AGPset: 82443GX Host Bridge/Controller, Datasheet; Jun. 1998, pp. 126.

PCI Legal Bus, PCI-X Addendum to the PCI Local Bus Specification, Revision 1.0a, Jul. 24, 2000, pp. 240.

* cited by examiner

*Primary Examiner*—Khanh Dang
(74) *Attorney, Agent, or Firm*—Blakely, Sokoloff, Taylor & Zafman LLP

(57) ABSTRACT

The present invention is in the field of bridging transactions from one bus to a second bus. More particularly, embodiments of the present invention can enhance an interface between two buses by ordering split-completion transactions to one or more hosts.

35 Claims, 5 Drawing Sheets

DATA BRIDGE AND BRIDGING

FIELD OF INVENTION

The present invention is in the field of data transmission. More particularly, the present invention provides a method, apparatus, system, and machine-readable medium to bridge data between buses.

BACKGROUND

Computers and other digital devices can have multiple components that are interconnected with a data bus or bus. The bus can allow one component to transact with a second component on the same bus. Components connected to the bus are commonly called agents and when an agent requests or initiates a transaction on the bus, that agent is typically called a requester. The requester may claim the bus for the duration of the transaction, preventing other agents from using the bus. Agents responding to the transaction initiated by the requester are typically called target devices.

One type of agent, called a bridge, can allow transactions initiated on one bus to complete on a second bus and may act as both a target device and a requesting agent. For example, when a requester initiates a transaction on a primary bus and the transaction requires interaction with an agent on a secondary bus, the bridge interconnecting the primary bus and the secondary bus can act as a target device on the primary bus and a requesting agent on the secondary bus. When the bridge acts as a requesting agent, referred to as an initiator, on the secondary bus, the bridge initiates a transaction equivalent to the transaction received on the primary bus. Initiating an equivalent transaction on the secondary bus is commonly referred to as forwarding the transaction. The target device may respond with data or a status of completion or error. The bridge stores the data or status to transfer to the requester when the primary bus becomes available. Then, the bridge can return data or a status to the requester by initiating a transaction on the primary bus.

When a bridge transfers a single transaction from a first bus to a second bus, the bridge may have idle time, causing agents that also need to use the bridge to have idle time. For example, a first agent and a second agent, both coupled to a first bus, may simultaneously request that the bridge process a transaction. The bridge can accept one transaction and may accept the transaction from the first agent. The second agent may remain idle until its transaction is processed. While attempting to forward the transaction of the first agent, the bridge can remain idle until the target device and second bus are available. Once a response is received from the target device, the bridge may remain idle until the primary bus is available to return the response to the first agent. Finally, the second agent can forward a transaction to the bridge when the first bus becomes available. This idle time of the second agent may be reduced by allowing a bridge to process more than one transaction, however, the second agent can still remain idle while waiting for the first transaction to complete on the second bus as well as the first bus.

BRIEF FIGURE DESCRIPTIONS

In the accompanying drawings like references may indicate some similarities between elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated are too numerous to discuss individually so the detailed descriptions below are designed to make such embodiments obvious to a person of ordinary skill in the art.

Figure 1:
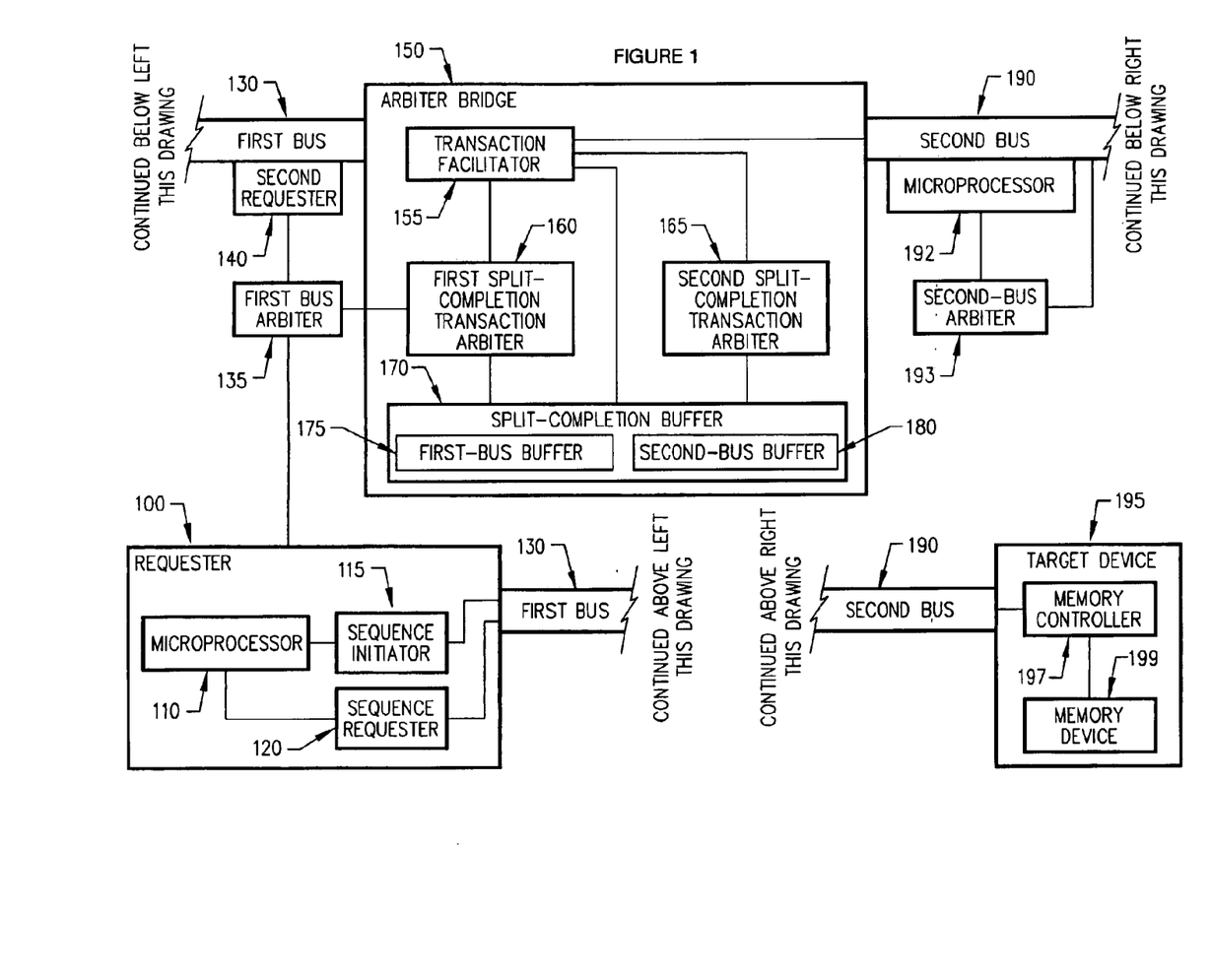
FIG. 1 depicts multiple hosts on a first bus coupled to a target device on a second bus via a bridge.

In particular, FIG. 1 shows an example embodiment of an apparatus in which an arbiter bridge 150 may couple hosts, requester 100 and a second requester 140, on a first bus 130 to a target device 195 on a second bus 190. The first bus arbiter 135 may coordinate interaction via the first bus 130 between the requester 100, the second requester 140, and the arbiter bridge 150 by determining which agent can initiate a transaction, i.e. the requester 100, the second requester 140, or the arbiter bridge 150. In some embodiments, the first bus arbiter 135 comprises a fairness determiner and a latency timer. The fairness determiner may comprise a procedure to determine which agent can initiate a transaction on the first bus 130, such as a multi-level, round robin determiner. The multi-level, round robin determiner may provide substantially equivalent access to each agent requesting a transaction at an equivalent priority level and less access to agents at lower priority levels. The latency timer can monitor the transaction on the first bus 130 and limit the transaction to a default number of cycles or amount of data, varying per priority level of the transaction. In further embodiments, the number of cycles available for a transaction can be determined by the first bus arbiter 135 based upon conditions such as the number of transactions requested of the first bus arbiter 135.

The requester 100 can comprise a microprocessor 110, a sequence initiator 115, and a sequence requester 120. The requester 100 may be a video processing board designed to relieve microprocessor 192 of computations related to displaying information on a monitor. The microprocessor 110 may be designed to perform specific types of computations such as two-dimensional and three-dimensional object manipulation as well as two-dimensional rendering of the manipulations. In this example embodiment, the microprocessor 110 may access memory device 199 via memory controller 197 to read from and write to video memory.

The microprocessor 110 may be coupled to the sequence initiator 115 to initiate a transaction on the first bus 130 when the first bus arbiter 135 indicates to the requester 100 that the first bus 130 is available for a transaction. The microprocessor 110 may be coupled to the sequence requester 120 to claim and retrieve a split-completion from first bus 130 when a completer, e.g. the arbiter bridge 150, for a transaction initiated by the sequence initiator 115 is made available on the first bus 130. The split-completion may comprise data in response to a read or a split-completion message, such as an error message or a status message. The requester 100 is coupled to the first bus arbiter 135 to request a transaction be initiated on the first bus 130 and to receive an indication from the first bus arbiter 135 that the first bus 130 is available to initiate a transaction. Similarly, the second requester 140 is coupled to the first bus arbiter 135 to request and receive access to first bus 130 to initiate a transaction. The second requester 140 may also initiate a transaction and receive a split-completion for the transaction.

Referring still to FIG. 1, the arbiter bridge 150 can facilitate a transaction between an agent on the first bus 130 and a target device 195 on a second bus 190. In the present embodiment, the arbiter bridge 150 comprises a transaction facilitator 155, a first split-completion transaction arbiter 160, a second split-completion transaction arbiter 165, and a split-completion buffer 170. The transaction facilitator 155 may initiate or receive a transaction from the first bus 130 in accordance with inputs from the first bus arbiter 135 and the first split-completion transaction arbiter 160. In some embodiments, the transaction facilitator 155 must also monitor the first bus 130 to determine when first bus 130 becomes available to initiate a transaction. For example, the requester 100 may request that first bus arbiter 135 grant access to requester 100 to initiate a transaction, e.g. a read request, to be forwarded to the target device 195. The first bus arbiter 135 may indicate to the requester 100 that the first bus 130 is available to initiate a transaction. The sequence initiator 115 may sense a signal change on first bus 130, indicating that the bus is not in use, and initiate a sequence of transactions on first bus 130. The sequence of transactions may perform all the reads necessary of the target device 195 to accomplish a particular task such as determining the type, size, and number of monitors available to display information.

In some embodiments, the requester 100 may also have a latency timer, referred to as a master latency timer, to indicate when the requester 100 must conclude a transaction of the sequence of transactions. Otherwise, a latency timer in the first bus arbiter 135 may indicate to the requester 100 that the transaction must conclude.

The transaction facilitator 155 of arbiter bridge 150 may sense the transaction from requester 100 on first bus 130 and determine that the transaction must be completed on the second bus 190. The first split-completion transaction arbiter 160 may sense the transaction via the transaction facilitator 155, store a representation of the transaction in the first-bus buffer 175 of the split-completion buffer 170, and determine a priority level for that split-completion transaction. Further, the second requester 140 may request access to first bus 130, receive an indication from first bus arbiter 135 to initiate the transaction, and initiate the transaction. The first-split-completion transaction arbiter 160 may also store this second transaction in the first-bus buffer 175 along with a priority level.

The second split-completion transaction arbiter 165 can read the split transactions stored in first-bus buffer 175 in an order according to priority level, and initiate a split-completion transaction on the second bus 190. The transaction facilitator 155, when granted access by second split-completion transaction arbiter 165, can initiate a transaction on second bus 190 for the highest priority split-completion transaction stored in first-bus buffer 175. In many embodiments, circuitry of the transaction facilitator 155 to initiate and receive transactions can operate independently for each bus.

The target device 195 can receive the transaction and respond with a split-completion, e.g. data for a read request for requester 100 or a status of a write request for second requester 140. The target device 195 may be system memory and can comprise a memory controller 197 coupled to a memory device 199 to store and sense data. For instance, the memory device 199 may comprise random access memory, dynamic random access memory, read only memory, synchronous dynamic access memory, and some other type of memory and the memory controller 197 may be designed to access the memory device 199.

The microprocessor 192 may be a general-purpose microprocessor for a computer or laptop and may compete for access to the second bus 190 with the arbiter bridge 150 and the target device 195. When the microprocessor 192 has a vital system function to perform, the transactions initiated by the microprocessor 192 may have the highest priority on the bus. The second-bus arbiter 193 may determine the agent with the highest priority and allow that agent to initiate a transaction.

Transaction facilitator 155 can sense the response from target device 195 on second bus 190 and second split-completion transaction arbiter 165 can instruct the transaction facilitator 155 to store the data from a read or the status from the write in second-bus buffer 180 of the split-completion buffer 170. In some embodiments, the second split-completion transaction arbiter 165 can receive the data or the status from the second bus 190 via the transaction facilitator 155 and store the data or status in the second-bus buffer 180.

The first split-completion transaction arbiter 160 can sense the data or status in second-bus buffer 180 and request first bus arbiter 135 grant access to initiate a transaction on first bus 130. Once the first split-completion transaction arbiter 160 receives an indication to proceed with the transaction on first bus 130, the first split-completion transaction arbiter 160 can initiate the highest priority transaction stored in second-bus buffer 180. When first split-completion transaction arbiter 160 initiates a transaction to return data retrieved from target device 195 to requester 100, the sequence requester 120 can sense the completion and receive the data.

In some embodiments, the priority level of the split-completions can be based on the chronological sequence of their receipt. In other embodiments, requester 100 may have a fixed and higher priority than second requester 140 or vice versa. In still other embodiments, multiple priority levels can be assigned to transactions based on fairness determinations by requester 100 and by second requester 140. Several of these embodiments may comprise a priority determination with promotion and demotion capabilities.

Transactions initiated by sequence initiator 115 can comprise a requester identification (requester ID). The requester ID may be maintained by the arbiter bridge 150 in the split-completion buffer 170 before and after the transaction is completed on the second bus 190. When the completion transaction is initiated on first bus 130, the sequence requester 120 can identify that the transaction is for requester 100 and the number of the transaction within a sequence of transactions. In further embodiments, the sequence of transactions is also identified in the requester ID so that the particular sequence that the completion is for can be identified when returned to requester 100.

The priority level chosen for a split-completion stored in first-bus buffer 175 may be determined both by the priority level assigned to the transaction by requester 100 or second requester 140 and by the chronological order of receipt of the transaction by transaction facilitator 155. For example, requester 100 may initiate a transaction of a second priority level, second requester 140 may initiate a transaction of second priority level, and then second requester 140 may initiate a transaction of a first priority level, all of which are stored in first-bus buffer 175. The first priority level transaction from second requester 140 can be initiated first on the second bus 190. Then the second priority transaction from a requester 100 can be initiated and, finally the second priority transaction may be initiated by the second requester 140.

The second priority transaction initiated first by requester 100, in some embodiments, will be initiated first on the second bus 190 followed by the first priority request from the second requester 140 and the second priority request from second requester 140. In alternative embodiments, the sequence of split-completions initiated on the second bus 190 is determined independently from the sequence of the split-completions initiated on first bus 130.

Several embodiments of the invention comprise target devices attached to first bus 130 and requesters, such as requester 100 and second requester 140, connected to second bus 190. In such embodiments, all transactions initiated on second bus 190 and corresponding completions initiated on the first bus 130 may be stored in second-bus buffer 180 of the split-completion buffer 170. All transactions initiated on first bus 130 as well as their corresponding completions initiated by target devices on second bus 190 may be stored in first-bus buffer 175. In still further embodiments, first-bus buffer 175 may comprise all split-completion transactions initiated or responded to on first bus 130 and second-bus buffer 180 may comprise all split-completion transactions initiated or responded to on second bus 190. In these embodiments, first split-completion transaction arbiter 160 can determine the sequence of split-completions to be completed on first bus 130 from second-bus buffer 180 and vice-versa. However, in many embodiments, first split-completion transaction arbiter 160 can determine the priority to initiate split-completion transactions initiated by a requester on the first bus 130 and second split-completion transaction arbiter 165 can determine the order to initiate split-completion transactions on the second bus 190 based on that priority and vice-versa.

Figure 2:
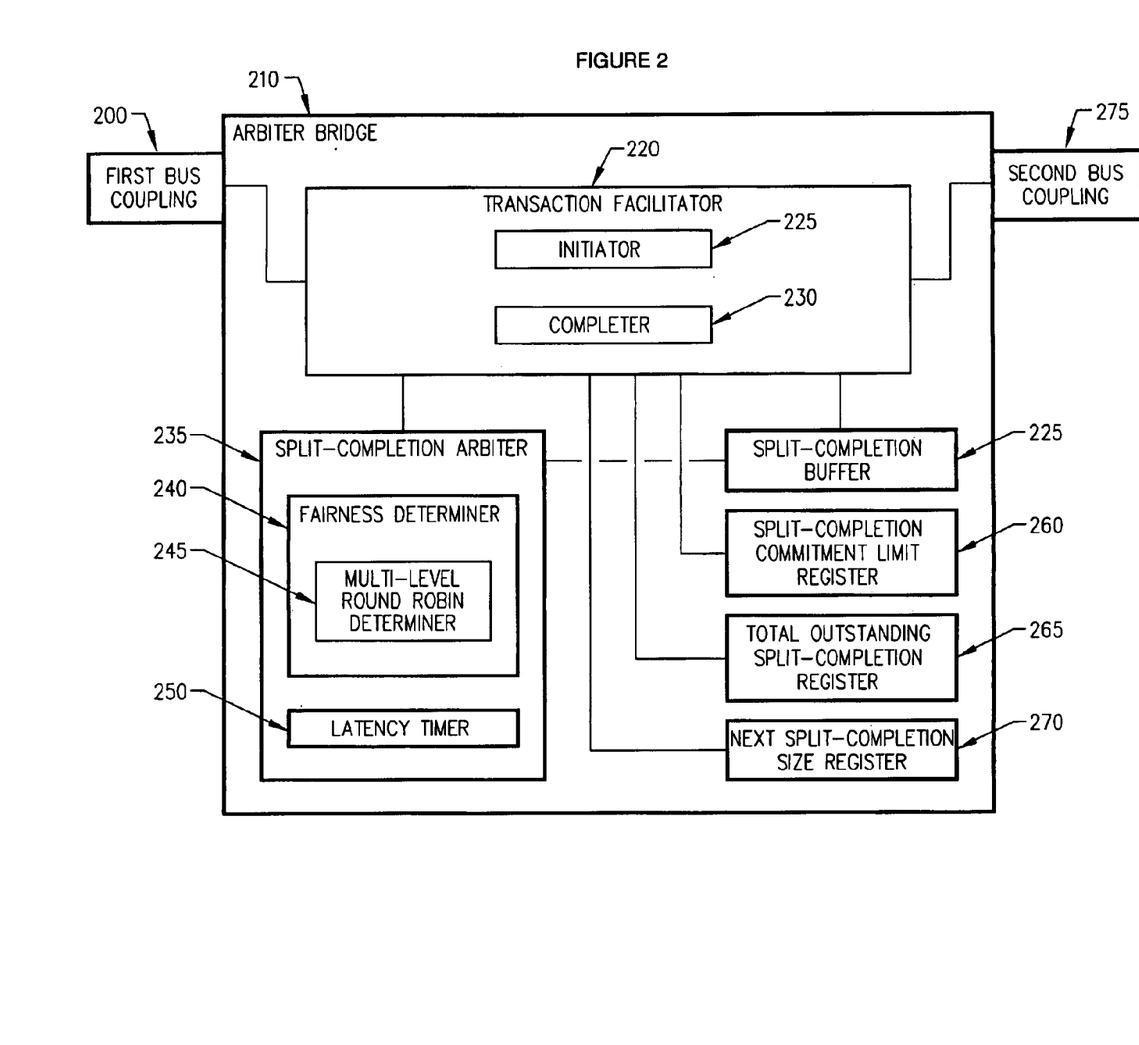
FIG. 2 depicts a bridge to couple more than one bus.

Referring now to FIG. 2, there is shown a second example apparatus embodiment of the present invention. The arbiter bridge 210 is coupled to a first bus coupling 200 and a second bus coupling 275. The arbiter bridge 210 may facilitate transactions between agents coupled to a first bus with their targets coupled to a second bus or facilitate transactions between agents coupled to a second bus with their targets coupled to a first bus. The arbiter bridge 210 comprises a transaction facilitator 220, a split-completion arbiter 235, a split-completion buffer 255, a split-completion commitment limit register 260, a total outstanding split-completion register 265, and a next split-completion size register 270. The transaction facilitator 220 is coupled to the first bus coupling 200 and the second bus coupling 275 to initiate and receive transactions from the bus couplings. In some embodiments of the invention, initiating or receiving transactions via a bus requires a handshake such as a signal indicating acceptance of the transaction and a signal indicating a termination of the transaction. Some of these embodiments require termination of a transaction in specific intervals. For example, in some embodiments, initiators and targets disconnect transactions only on allowable disconnect boundaries (ADB's). Specifying an ADB can help calculate the amount of data transferred in a transaction when the termination of a transaction is requested within a period of time by a target device. ADB's are typically set at a specific number of clock cycles or bytes. When the ADB is set by a specific number of clock cycles, the number of bytes transferred during a transaction between ADB's is a function of the number of bits transferred in parallel on a bus.

The transaction facilitator 220 can comprise an initiator 225 and a completer 230. The initiator 225 can be coupled to the first bus coupling 200 and the second bus coupling 275 to initiate transactions. The initiator 225 may comprise an independent initiator for the first bus coupling 200 and an independent initiator for the second bus coupling 275. The completer 230 may be coupled to a first bus coupling 200 and the second bus coupling 275 and may also comprise independent circuitry for each coupling. The completer 230 may initiate split-completion transactions via either coupling, in some embodiments. In addition, the transaction facilitator 220 may be coupled to the split-completion buffer 255 to store split-completions.

A split-completion can be data representing a transaction initiated on one bus that has to be completed on a second bus. For example, a transaction may be initiated on a first bus comprising an address phase, and an attribute phase, a target response phase, a data phase, and an initiator termination. The address phase can indicate an address of an agent or target device on a second bus and the transaction facilitator 220 can recognize that arbiter bridge 210 should claim the transaction via first bus coupling 200. When space is available in the split-completion buffer 255, the address is stored by the transaction facilitator 220 in split-completion buffer 255. Otherwise, arbiter bridge 210 may respond with a retry in the target response phase, asking the requester to initiate the transaction at a later time.

The second phase of the transaction is the attribute phase which comprises transmission of attributes describing the transaction from the requester on the first bus coupling 200. The attributes can comprise a sequence identification, a transaction identification, and a transaction function. The sequence identification may be a unique tag to identify the sequence of transactions that this transaction belongs to the requester. The transaction identification may describe the transaction of the sequence to the requester. The requester identification may identify the requester that should claim the transaction when the completer 230 performs a split-completion transaction via first bus coupling 200. The transaction function describes the transaction's purpose, such as a read of data at an address or a write of data to an address of the target device on the second bus.

In the target response phase, the arbiter bridge 210 can claim the transaction since the address transmitted in the address phase corresponds to a target device on the second bus. During the data phase, the requester on the first bus transmits data to the target for the first bus, i.e. the arbiter bridge 210. Once the requester transmits the data for the transaction, the requester signals the end of the transaction during the initiator termination phase. In some embodiments of the invention, the initiator termination phase occurs one clock cycle before the last data phase.

In the present embodiment, the transaction facilitator 220 is coupled to the split-completion commitment limit register 260, total outstanding split-completion register 265, and next split-completion size register 270. These registers 260, 265, and 270 may be used to determine the method the transaction facilitator 220 can use to terminate a transaction of a requester. The transaction facilitator 220 may terminate a transaction with a split response, accepting a split-completion to store in the split-completion buffer 255 or with a retry. When the split-completion buffer 255 is unable to store the split-completion of the transaction, the transaction facilitator will terminate the transaction with a retry, essentially telling the requester to request the transaction at a later time.

The split-completion commitment limit register 260 may indicate the accumulative sequence size of split transactions the bridge can have outstanding at one time. Normally the split-completion commitment limit register 260 indicates a size in allowable disconnect boundary delineated quantum units (ADQ's). ADQ's can indicate a specific size such as 128 bytes or a size as a function of a bus width, i.e. the number of bits a bus is designed to transmit in parallel. In many embodiments, the maximum number of outstanding split transactions may be limited by the system incorporating the arbiter bridge 210. In other embodiments, the maximum outstanding split transactions for the buses connected to the bridge 210 can be set by the arbiter bridge 210.

The total outstanding split-completion register 265 may hold data representing the total outstanding split-completion transactions in a particular direction such as from the first bus coupling 200 to the second bus coupling 275 or from the second bus coupling 275 to the first bus coupling 200. The next split-completion size register 270 can indicate the amount of buffer space the arbiter bridge 210 has in the split-completion buffer 255 to store split-completions. The amount of buffer space may be stored in ADQ's. For example, a requester may initiate a transaction on a first bus. The transaction facilitator 220 may receive the transaction and the transaction may comprise data including the size of a split-completion. The transaction facilitator 220 can then determine whether the split-completion transaction size together with the total outstanding split-completion transaction from the first bus to the second bus is greater than or equal to the accumulative sequence size of split transactions that the arbiter bridge 210 can have outstanding at one time, as identified in the split-completion commitment limit register 260. In this embodiment, the arbiter bridge 210 tracks all transactions it forwards from the first bus coupling 200 to the second bus coupling 275 stored in the split-completion buffer 255 as a single sequence and compares that to the split-completion commitment limit register 260. Thus, the size stored in the total outstanding split-completion register 265 for transactions forwarded in one direction can be a running total of a varying sized sequence incremented when a split-completion is accepted in the same direction and decremented when such a split-completion is returned to the requester. In addition, the transaction facilitator 220 compares the transaction initiated in one direction with the next split-completion size register 270 to determine if sufficient buffer space is available to store the split-completion.

The split-completion arbiter 235 is coupled to the transaction facilitator 220 and the split-completion buffer 255. The split-completion arbiter 235 can determine the sequence of split-completions forwarded to a bus via first bus coupling 200 or the second bus coupling 275 and split-completions returned to the requester. The sequence priority assigned to a split-completion by the split-completion arbiter 235 from a first bus, for instance, to a second bus, is same sequence priority assigned to the split-completion returned to the requester on the first bus. The split-completion arbiter 235 can comprise a fairness determiner 240 and a latency timer 250. The fairness determiner 240 may determine a sequence of transactions for the split-completions in the split-completion buffer 255. The fairness determiner 240 may comprise a multi-level, round robin determiner 245. The multi-level, round robin determiner 245 can sequence split-completion transactions according to priority levels and sequence the split-completion transactions within each priority level according to their chronological order of the receipt. On the other hand, the latency timer 250 may monitor the duration of a split-completion transaction, normally in number of cycles or in number of ADB's. In the present embodiment, the arbitration of split-completion transactions between the first bus coupling 200 and second bus coupling 275 is independent of the arbitration of split-completion transactions from second bus coupling 275 to first bus coupling 200. In other embodiments, requesting agents may not be connected to the second bus so arbitration need only sequence transactions from the first bus coupling 200 to the second bus coupling 275, including the completer's 230 split-completion transaction when applicable.

Several embodiments of the invention comprise a split-completion arbiter 235 that also acts as a first bus arbiter. Thus, the split-completion arbiter 235 arbitrates transactions on the first bus between agents connected to the first bus including the arbiter bridge 210. The split-completion arbiter 235 in these embodiments may group the split-completions in the split-completion buffer 255 on a different priority level than the agents connected directly to the first bus. The arbiter bridge 210, however, may be at the same priority level as the other agents on first bus.

Many embodiments may perform delayed transactions under certain circumstances. For instance, when an agent on first bus is not designed to perform split-completion transactions, transactions initiated by that agent may be treated as delayed transactions by the arbiter bridge 210. In some embodiments, when one agent on a bus is not designed to perform split-transactions, many transactions that would otherwise be treated as split-transactions can be treated as delayed transactions.

Figure 3:
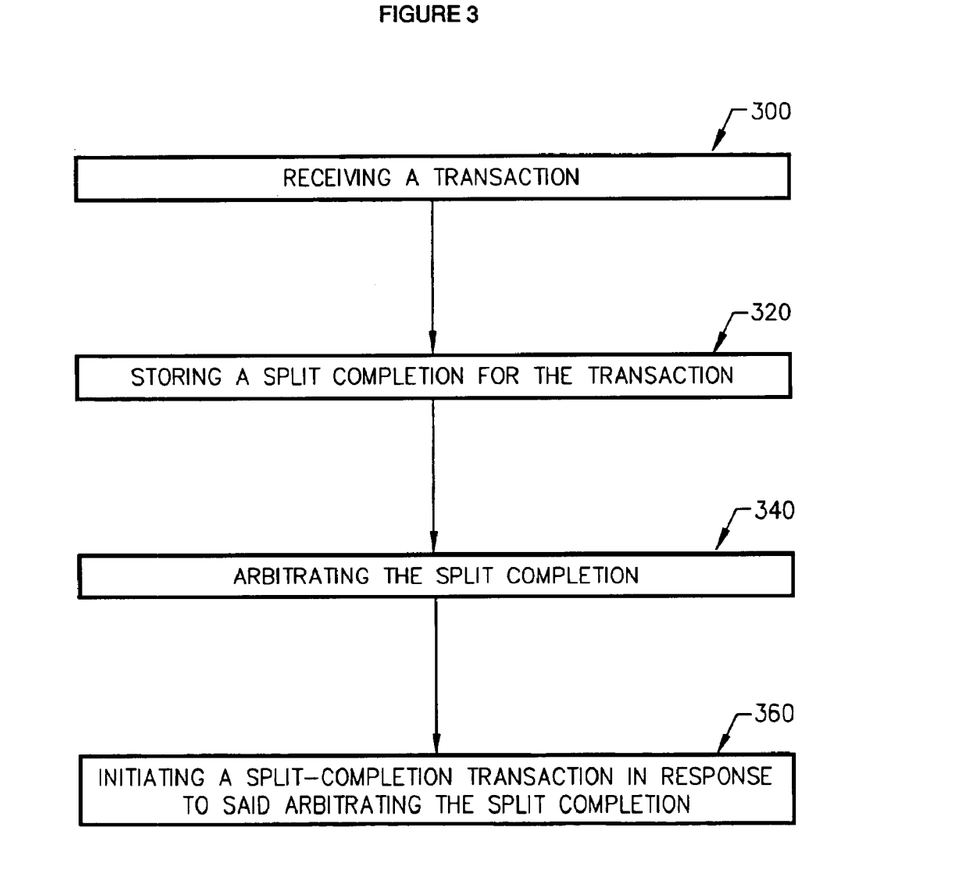
FIG. 3 depicts a flow chart to process a transaction.

Referring now to FIG. 3, there is shown an example flow chart of embodiments of the invention. The flow chart shows actions that may not need to be performed in the order shown. The flow chart comprises receiving a transaction 300 storing a split-completion for the transaction 320; arbitrating the split-completion 340; and initiating a split-completion transaction in response to said arbitrating the split-completion 360. Receiving a transaction 300 may monitor a bus for a transaction to be forwarded to a second bus. Receiving a transaction 300 can comprise determining that the address transmitted during the address phase of the transaction belongs to a target device on a second bus; claiming the transaction; and receiving a split-completion.

Storing a split-completion for the transaction 320 may save a sufficient description of the transaction to initiate the same transaction on a second bus. Storing a split-completion for the transaction 320 can comprise, for example, storing a sequence identification (sequence ID) and a starting address or a partial starting address. The sequence ID may comprise a requester ID and a sequence tag. The requester ID can include a requester bus number, a device number, and a function number. The requester bus number may be a number identifying the bus of the requester that initiated the transaction sequence. The device number can be the number identifying the agent on the requester bus, and the function number may include a reference to the command type for the transaction, such as read or write. In some embodiments, the sequence tag is a five-bit number assigned by the initiator of a sequence to distinguish it from other sequences and tags can be reused after the sequence has been completed.

Arbitrating the split-completion 340 can select an order for the stored split-completions. In some embodiments, arbitrating the split-completion 340 can also monitor the duration of a split-completion transaction and terminate the split-completion transaction after a certain period of time or a certain number of cycles. In some of these embodiments, the period of time or number of cycles can be counted by the number of ADB's. In other embodiments, arbitrating the split-completion 340 can comprise monitoring the amount of data transferred in a split-completion transaction. A fairness determination such as a multi-level, round robin determination or a fixed-priority determination can be used to select a sequence of split-completion transactions. Many embodiments designed for particular applications have a fairness determination tailored for the application.

In addition, arbitrating the split-completion 340 may receive a maximum split-completion transaction duration, determine a maximum split-completion duration, or read the maximum split-completion transaction duration from a fixed location. Receiving the maximum split-completion transaction duration can comprise receiving an attribute in a transaction from a requester. Determining a maximum split-completion transaction duration can comprise determining the maximum duration from a function number, a device number, a requester bus number, a sequence tag, or an address. Reading a maximum split-completion transaction duration from a fixed location is typically executed when the present embodiment is part of a system that can modify characteristics of transactions dependent upon operating conditions such as the number of transactions being processed.

Initiating a split-completion transaction in response to said arbitrating the split-completion 360 can initiate a split-completion transaction in a sequence determined by arbitrating the split-completion 340. Initiating a split-completion transaction in response to said arbitrating the split-completion 360 may comprise forwarding a split-completion transaction on a bus of a target device for the split-completion transaction. Further, initiating a split-completion transaction in response to said arbitrating the split-completion 360 may comprise initiating a split-completion transaction on the requester bus to forward a split-completion to the requester. Forwarding a split-completion to the requester can include forwarding a status to the requester or forwarding data from a read to the requester.

Figure 4:
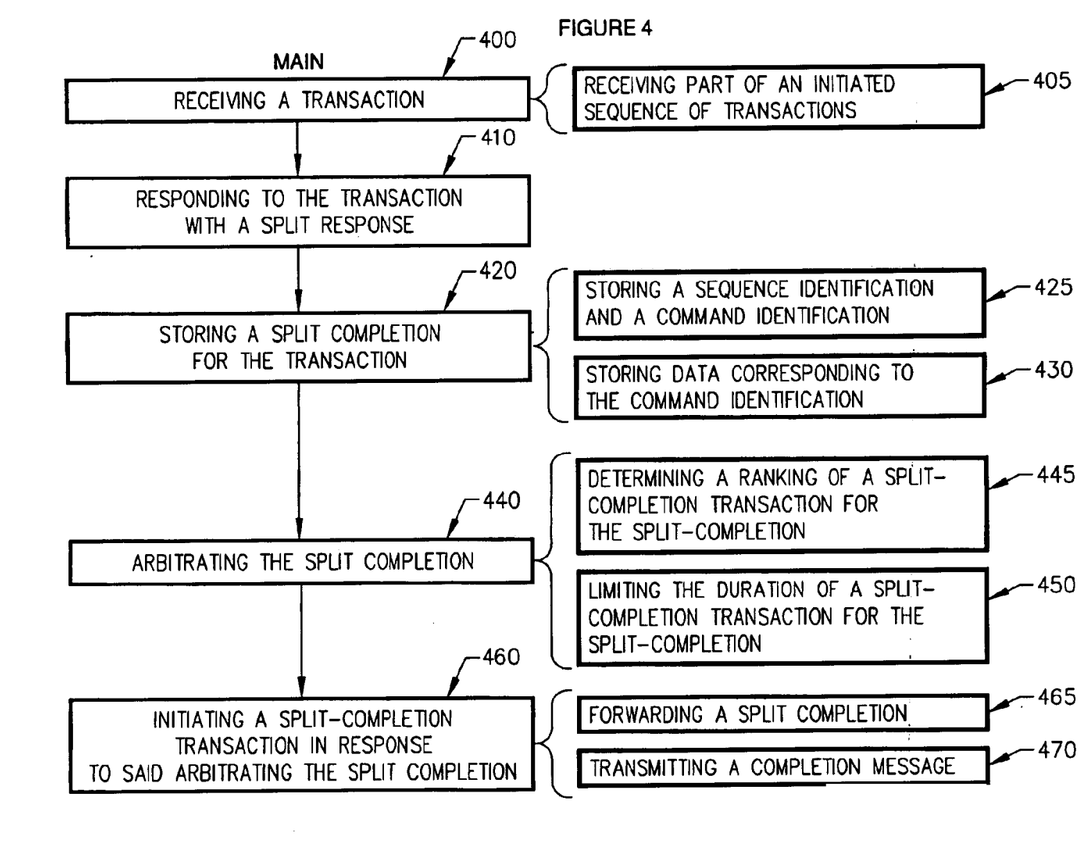
FIG. 4 depicts another flow chart to process a transaction.

Referring now to FIG. 4, a flow chart of an embodiment of the invention is shown. The flow chart comprises receiving a transaction 400, responding to the transaction with a split response 410, storing a split-completion for the transaction 420, arbitrating the split-completion 440, and initiating a split-completion transaction in response to said arbitrating the split-completion 460. Receiving a transaction 400 can comprise receiving part of an initiated sequence of transactions 405. Receiving part of an initiated sequence of transactions 405 may recognize a transaction as a split-completion transaction, claim the transaction, and store a split-completion. The split-completion may comprise a reference to the corresponding sequence initiated by the requester. Responding to the transaction with a split response 410 may terminate a transaction with an indication to the requester that the split-completion has been claimed and will be forwarded as a split transaction.

Storing a split-completion for the transaction 420 can store data representing the transaction such that the transaction can be repeated on a different bus. Storing a split-completion for the transaction 420 may comprise storing a sequence identification and a command identification 425 and storing data corresponding to the command identification 430. Storing a sequence identification and a command identification 425 may store data in the split-completion linking the split-completion to a sequence from a bus and a requester on that bus as well as to the function to be performed on the target device on the second bus. Whereas, storing data corresponding to the command identification 430 can comprise storing data to be written to a memory location.

Referring still to FIG. 4, arbitrating the split-completion 440 may determine fair access to a bus for split-completion transactions. Arbitrating the split-completion 440 can comprise determining a ranking of a split-completion transaction for the split-completion 445 and limiting the duration of a split-completion transaction for the split-completion 450. Determining a ranking of a split-completion transaction for the split-completion 445 can comprise determining a sequence for the split-completion transactions based on priority, chronological order of receipt, or both priority and chronological order of receipt. For example, agent one on a bus may require immediate transactions and process transactions at a rate significantly higher than other agents connected to the bus. Thus, agent one may be given the highest priority for that bus, placing any transactions for that agent first in line for split-completion transactions. A group of agents connected to the same bus may be given a second, lower priority level and within that second priority level the transactions may be organized according to chronological order of receipt. A second group of agents connected to the same bus may be placed at the second priority level as a group.

To illustrate, assume that (a) is an agent at the highest priority level, the first priority level, (b) and (c) are agents at the second priority level and (d) and (e) are agents that as a group are in the second priority level. When (a) creates a transaction on the bus, the split-completion for (a) is placed in front of any split-completion transactions for (b), (c), (d) or (e) but behind any split-completion transactions received from agent (a) prior to that transaction. Then, (b), (c), (d) and (e) initiate transactions requiring split-completion transactions respectfully. The split-completion transaction for (b) is placed behind the split-completion transaction for (a), the split-completion transaction for (c) at the same priority level as the split-completion for (b), but received later in time, is placed behind the split-completion transaction for (b), and the split-completion transactions for (d) and (e) are placed behind the split-completion transaction for (c) respectfully. Now, assume that a transaction requiring a split-completion transaction is initiated by agent (b) prior to completing the split-completion transaction for agent (a). The split-completion transaction now initiated for agent (b) is placed behind the split-completion transaction for (d) but in front of the split-completion transaction for (e) because (d) and (e) as a group have a priority equal to the priority levels of (b) and (c) individually.

Limiting the duration of a split-completion transaction for the split-completion 450 may prevent any one agent from holding onto the bus and starving other agents requiring split-completion transactions on that bus. Limiting the duration of a split-completion transaction for the split-completion 450 can comprise decrementing the contents of a counter from a maximum split-completion transaction duration to zero or until the transaction concludes, whichever is earlier. In some embodiments, a master latency timer is used to count the number of cycles or to count the number of ADB's between the initiation of a split-completion transaction and the conclusion. The maximum duration for a split-completion transaction can be determined based upon priority level, can be a preset duration, or can be a function of the priority level and the number of split-completion transactions to be performed.

Initiating a split-completion transaction in response to said arbitrating the split-completion 460 may initiate a transaction on a second bus or return data or a status to the requester on the first bus. Initiating a split-completion transaction in response to said arbitrating the split-completion 460 can comprise forwarding a split-completion 465 and transmitting a completion message 470. Forwarding a split-completion 465 may initiate a split-completion transaction on a second bus. Transmitting a completion message 470 can transmit data or a status bit to the requester. For example, when a requester initiates a transaction on a first bus, that transaction may become a split-completion transaction that is initiated on the second bus to read data from a memory location. The data read from the memory location is initiated in a split-completion transaction on the first bus to transmit the data to the requester. On the other hand, when the requester initiates a write data transaction to be performed on a second bus via a split-completion transaction, the target device may return a status indicating that the write is complete. Then, a split-completion transaction can be initiated on the first bus to inform the requester that the write is complete.

In several embodiments, arbitrating the split-completion 440 can comprise determining a ranking of a split-completion transaction for the split-completion in chronological order and limiting the duration of a split-completion transaction to a duration stored in a predetermined memory location. Further embodiments return a status to a write split-completion transaction only when an error has occurred and a write was not performed.

Figure 5:
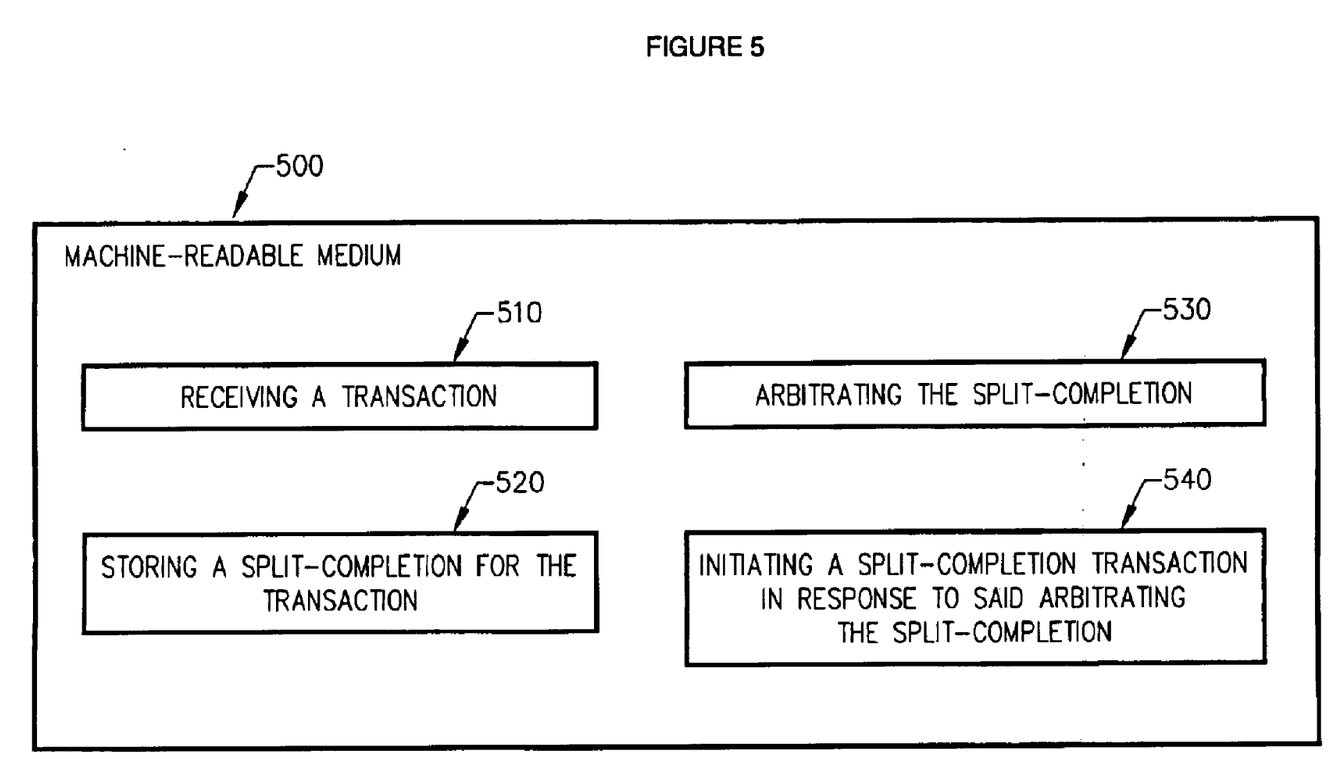
FIG. 5 depicts a machine-readable medium comprising instructions to process a transaction.

Referring now to FIG. 5, a machine-readable medium embodiment of the present invention is shown. A machine-readable medium includes any mechanism that provides (i.e. stores and or transmits) information in a form readable by a machine (e.g., a computer), that when executed by the machine, can perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention can comprise more than one machine-readable medium depending on the design of the machine.

The machine-readable medium 500 comprises instructions for receiving a transaction 510, storing a split-completion for the transaction 520, arbitrating the split-completion 530, and initiating a split-completion transaction in response to said arbitrating the split-completion 540. Receiving a transaction 510 may be instructions to receive all or part of a sequence of transactions from a requester. When receiving a part of a sequence of transactions from a requester, receiving a transaction 510 can comprise receiving a sequence ID, an address, and data. The sequence ID can comprise a reference that identifies a requester and the part of the sequence that the transaction represents. In some embodiments, the sequence ID may also have a reference identifying the particular sequence to which the transaction belongs. The address can identify a target device and also a memory location if applicable. Data may accompany the transaction when the transaction requires a write of that data to a memory location. In addition, storing a split-completion for the transactions 520 can comprise instructions for storing the sequence ID, address, and data in a split-completion buffer. In some embodiments, storing a split-completion for the transaction 520 can comprise storing sufficient reference to the transaction to initiate the same transaction on a second bus.

Arbitrating the split-completion 530 may comprise instructions to place the split-completions in a sequence for initiating the split-completion transaction and assign a maximum duration for the split-completion transaction. When the split-completion requires a split-completion transaction of longer duration then the maximum duration assigned to that split-completion transaction, instructions may split the split-completion into more than one split-completion transaction. When the split-completion is broken into more than one split-completion transactions, each of the more than one split-completion transactions may receive an independent sequence assignment. In some of these embodiments, instructions can reassemble the split-completion transaction into a single split-completion transaction to transmit a completion message to the requester. For instance, when the initial transaction by the requester required multiple writes to memory locations in a target device in the split-completion of the multiple writes to the target device would require a split-completion transaction of greater duration than the maximum split-completion transaction duration assigned by arbitrating the split-completion 530, the multiple writes can be split into separate split-completions and stored in a split-completion buffer. Each of the split-completions can then be placed in a sequence for split-completion transactions and each split-completion transaction may be assigned a second sequence ID. Once all the split-completion transactions have been performed on the target device and status for each split-completion transaction is returned, the status of all the split-completion transactions can be combined into a single transaction to be returned to the requester. In further embodiments, the sequence ID designed for a transaction that may be split into several split-completion transactions, may be modified, such as adding a bit, to indicate that the transaction was split into several split-completions.

Referring still to FIG. 5, initiating a split-completion transaction in response to said arbitrating the split-completion 540 can initiate a split-completion transaction for each split-completion assigned a sequence number. In addition, initiating a split-completion transaction in response to said arbitrating the split-completion 540 can comprise limiting the split-completion transaction to a duration assigned by arbitrating the split-completion 530. In other embodiments, initiating a split-completion transaction in response to said arbitrating the split-completion 540 can read a maximum split-completion transaction duration from a memory location.

What is claimed is:

1. A method, comprising:

receiving a transaction;

storing transaction information as a split-completion for the transaction;

arbitrating to select a split-completion from a plurality of stored split completions;

initiating a split-completion transaction according to the selected split-completion; and restricting a duration of the split-completion transaction according to a maximum split-completion transaction duration associated with the split-completion transaction.

2. The method of claim 1 further comprising responding to the transaction with a split response.

3. The method of claim 1 wherein said receiving a transaction comprises receiving part of an initiated sequence of transactions.

4. The method of claim 1 wherein said storing transaction information comprises storing a sequence identification and a command identification.

5. The method of claim 4 wherein said storing transaction information further comprises storing data corresponding to the command identification.

6. The method of claim 1 wherein said arbitrating the split-completion comprises determining a ranking of a split-completion transaction for the split-completion.

7. The method of claim 1 wherein said arbitrating the split-completion comprises determining the maximum split-completion transaction duration associated with the split-completion transaction.

8. The method of claim 1 wherein said initiating a split-completion transaction comprises transmitting a completion message.

9. The method of claim 1 wherein said initiating a split-completion transaction comprises forwarding the split-completion transaction.

10. The method of claim 1, wherein restricting the duration of the split-completion transaction comprises:
   decrementing a counter following each data transfer of the split-completion transaction, the counter initially set according to a byte transfer counter of the split-completion transaction; and
   terminating the split-completion transaction once the counter is clear.

11. The method of claim 7, wherein determining the maximum split-completion transaction comprises:
   loading a master latency timer for the split-completion transaction according to a byte transfer count of the split-completion transaction.

12. A machine-readable medium containing instructions, which when executed by a machine, cause said machine to perform operations, comprising:
   receiving a transaction;
   storing transaction information as a split-completion for the transaction;
   arbitrating to select a split-completion from a plurality of stored split-completions;
   initiating a split-completion transaction according to the selected split-completion; and
   restricting a duration of the split-completion transaction according to a maximum split-completion transaction duration associated with the split-completion transaction.

13. The machine-readable medium of claim 12 wherein said receiving a transaction comprises receiving part of an initiated sequence of transactions.

14. The machine-readable medium of claim 12 wherein storing the transaction information comprises storing a sequence identification and a command identification.

15. The machine-readable medium of claim 12 wherein said arbitrating the split-completion comprises determining a ranking of a split-completion transaction for the split-completion.

16. The machine-readable medium of claim 12 wherein said initiating a split-completion transaction comprises transmitting a completion message.

17. An apparatus, comprising:
   a buffer to store transaction information as a split completion of a transaction;
   an arbiter to initiate a split-completion transaction for a split completion selected from the buffer based upon a priority associated with the split completion and to restrict a duration of the split-completion transaction according to a maximum split-completion transaction duration associated with the split-completion transaction.

18. The apparatus of claim 17, further comprising a transaction facilitator coupled to said circuitry to track outstanding split-completion transactions.

19. The apparatus of claim 17, further comprising a transaction facilitator coupled to said circuitry to limit a quantity of outstanding split-completion transactions.

20. The apparatus of claim 17, further comprising a transaction facilitator to track available space in said buffer for a second split completion.

21. The apparatus of claim 17, further comprising:
   a transaction facilitator including:
      an initiator to forward the split-completion transaction to a target device, and
      a completer to respond to a requester of the split-completion transaction.

22. The apparatus of claim 17, wherein said arbiter is further to associate a priority with initiation of the split-completion transaction based upon a determination of fairness for a requester associated with the split completion.

23. The apparatus of claim 22, wherein the arbiter is further to determine fairness for the requester based upon a round robin selection of the requester.

24. The apparatus of claim 22, wherein the arbiter is further to determine fairness for the requester based upon a fixed priority for access by the requester.

25. The apparatus of claim 17, wherein said arbiter comprises a timer to monitor the duration of the split-completion transaction, the arbiter to terminate the split-completion transaction once the timer expires.

26. A system, comprising:
   a bus;
   a bridge to coupled to the bus. the bridge including:
      a buffer to store transaction information as a split completion of a transaction, and
      an arbiter to initiate a split-completion transaction for a split-completion selected from the buffer based upon a priority associated with the split completion, and to restrict a duration of the split-completion transaction according to a maximum split-completion transaction duration associated with the split-completion transaction; and
   a processor coupled to the bus to receive the split-completion transaction from said bridge.

27. The system of claim 26, wherein said processor is to transact with a target device via said bridge.

28. The system of claim 26, wherein said processor is further to respond to the split-completion transaction via said bridge.

29. The system of claim 26, wherein the arbiter is further to determine a sequence for the split-completion transaction based upon a priority associated with the split completion.

30. The system of claim 28, wherein said bridge further comprises a timer to limit the duration of the split-completion transaction.

31. The system of claim 26, wherein the bridge further comprises:
   a transaction facilitator to initiate the split-completion transaction according to the sequence.

32. The system of claim 31, wherein the bridge further comprises:
   a split-completion commitment limit register to indicate a maximum cumulative sequence size of outstanding split-completion transactions.

33. The system of claim 31, further comprising:
   next split-completion size register coupled to the transaction facilitator, the next split-completion size register to indicate an amount of available buffer space in the split-completion buffer available to store split-completions.

34. The system of claim 32, wherein the transaction facilitator is to terminate a transaction of a requester if acceptance of the transaction would cause a cumulative sequence size of pending split-completion transactions to exceed a value stored within the split-completion commitment limit register.

35. The system of claim 30, wherein the arbiter to store a byte transfer count of the split-completion transaction within the timer.

* * * * *